A. Jamison,
Water Wheel,
No. 49,114. Patented Aug. 1 1865.

Witnesses:
Wm Brewn
C.L. Topliff

Inventor:
Ander Jamison
per Munn & Co
Attorneys

UNITED STATES PATENT OFFICE.

ANDREW JAMISON, OF TAYLORSTOWN, PENNSYLVANIA.

IMPROVEMENT IN WATER-WHEELS.

Specification forming part of Letters Patent No. 49,114, dated August 1, 1865.

*To all whom it may concern:*

Be it known that I, ANDREW JAMISON, of Taylorstown, in the county of Washington and State of Pennsylvania, have invented a new and useful Improvement in Overshot Water-Wheels; and I do hereby declare that the following is a full, clear, and exact description thereof, which will enable those skilled in the art to make and use the same, reference being had to the accompanying drawings, forming part of this specification, in which—

Figure 2:
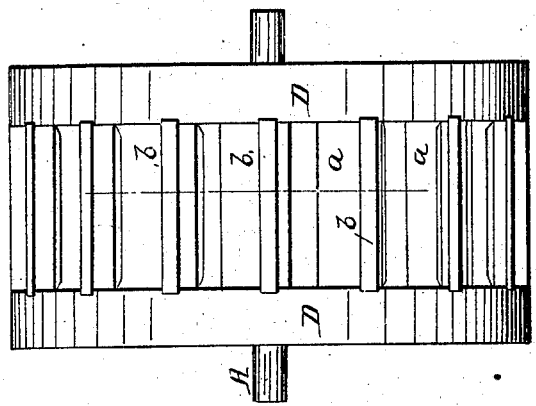
Figure 1:
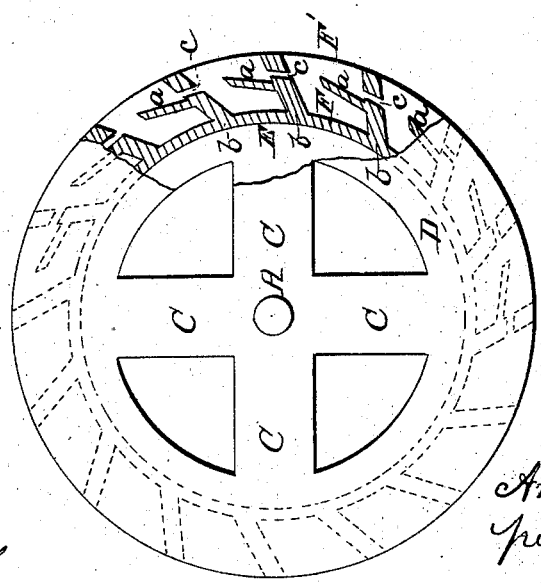

Figure 1 is a side view of my invention, partly in section; Fig. 2, a front or face view of the same.

Similar letters of reference indicate corresponding parts.

This invention relates to a new and useful improvement in overshot water-wheels; and it consists in constructing the buckets in such a manner that they will receive the force of the water and the wheel be driven by the impact as well as by the gravity of the water.

The main portion of the wheel may be constructed in the usual manner, A being the shaft, C the arms, D the rims, and E the "sole," which forms the inner sides of the buckets.

The buckets are constructed in a peculiar manner, so as to have two parts or portions, F F', as shown clearly in Fig. 1. The inner parts, F, are of a shape corresponding nearly to that of the ordinary buckets, the front or outer parts, $a$, having an oblique position, but not extending out to the edges or peirpheries of the rims D, as in ordinary wheels. The bottoms $b$ of the buckets extend fully out to the edges of the rims D, and a space or opening, $c$, is made in them extending their whole length; or the bottoms may be composed of two separate parts, the outer parts not being brought in contact with the inner parts, so as to leave a space between them, as shown clearly in Fig. 1. By this arrangement it will be seen that the water as it strikes the wheel will expend its force against the bottoms of the outer parts or portions, F', of the buckets and pass through the opening $c$ into the rear or inner parts, F, of the buckets underneath, in which it is retained until the buckets reach the lower part of the wheel underneath the shaft A. The wheel, therefore, will be driven both by the impact and the gravity of the water, whereas the ordinary overshot wheels are driven by the gravity of the water only. My improvement, therefore, will add materially to the effective power of the wheel.

The improvement may be applied to old wheels or those in use, and the buckets may be of wood or of wrought or cast metal.

I claim as new and desire to secure by Letters Patent—

Constructing the buckets of an overshot water-wheel in two parts, F F', the former, F, being so arranged as to contain or hold the water so that it can act upon the wheel by gravity, while the latter, F', are provided with openings $c$, and so arranged as to admit of the water acting upon or against them by impact and then allowing it to pass into the inner parts, F, of the buckets below, substantially as described.

ANDREW JAMISON.

Witnesses:
A. E. McCLEES,
J. A. FLACK.